US010500843B2

(12) United States Patent
Kurihara et al.

(10) Patent No.: US 10,500,843 B2
(45) Date of Patent: Dec. 10, 2019

(54) INK JET RECORDING APPARATUS

(71) Applicant: Hitachi Industrial Equipment Systems Co., Ltd., Chiyoda-ku, Tokyo (JP)

(72) Inventors: Hiroko Kurihara, Tokyo (JP); Takashi Kawano, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 15/565,220

(22) PCT Filed: Dec. 22, 2015

(86) PCT No.: PCT/JP2015/085732
§ 371 (c)(1),
(2) Date: Oct. 9, 2017

(87) PCT Pub. No.: WO2016/163056
PCT Pub. Date: Oct. 13, 2016

(65) Prior Publication Data
US 2018/0086052 A1     Mar. 29, 2018

(30) Foreign Application Priority Data
Apr. 10, 2015     (JP) .................... 2015-080510

(51) Int. Cl.
*B41J 2/045* (2006.01)
*B41J 2/01* (2006.01)
(Continued)

(52) U.S. Cl.
CPC ............ *B41J 2/04508* (2013.01); *B41J 2/01* (2013.01); *B41J 2/04505* (2013.01);
(Continued)

(58) Field of Classification Search
CPC ............... B41J 2/04541; B41J 2/04548; B41J 2/04506; B41J 2/01; B41J 2/07
See application file for complete search history.

(56) References Cited

U.S. PATENT DOCUMENTS 4,520,368 A * 5/1985 Ims ....................... B41J 2/08
                                                        347/39
6,533,385 B1 * 3/2003 Mackay ................ B41J 29/393
                                                        347/14

(Continued)

FOREIGN PATENT DOCUMENTS

JP      2010-137528 A      6/2010
JP      2010-228402 A     10/2010
(Continued)

OTHER PUBLICATIONS

International Search Report (PCT/ISA/210) issued in PCT Application No. PCT/JP2015/085732 dated Mar. 15, 2016 with English translation (two pages).

(Continued)

*Primary Examiner* — Sharon A. Polk
(74) *Attorney, Agent, or Firm* — Crowell & Moring LLP

(57) ABSTRACT

The purpose of the present invention is to provide an ink jet recording apparatus that improves printing quality when printing with a plurality of nozzles. The ink jet recording apparatus performs printing control of a plurality of nozzles using an encoder pulse output from an encoder attached to a conveying line, and is characterized by comprising: an input unit with which a printing character width is separately set for each of the plurality of nozzles; and a control unit that controls printing using a character width corresponding to input information from the input unit.

3 Claims, 15 Drawing Sheets

(51) Int. Cl.
  *B41J 2/07* (2006.01)
  *B41J 29/38* (2006.01)
  *H04N 1/64* (2006.01)
  *H04N 1/00* (2006.01)

(52) U.S. Cl.
  CPC ....... *B41J 2/04541* (2013.01); *B41J 2/04586* (2013.01); *B41J 2/07* (2013.01); *B41J 29/38* (2013.01); *H04N 1/00411* (2013.01); *H04N 1/642* (2013.01)

(56) References Cited

U.S. PATENT DOCUMENTS

2015/0165761 A1* 6/2015 Qiu .................... B41J 2/04576 347/9
2016/0046124 A1 2/2016 Takagishi et al.

FOREIGN PATENT DOCUMENTS

| JP | 2013-39788 A | 2/2013 |
| JP | 2015-33821 A | 2/2015 |
| WO | WO 2014/020979 A1 | 2/2014 |
| WO | WO 2014/155872 A1 | 10/2014 |

OTHER PUBLICATIONS

Japanese-language Written Opinion (PCT/ISA/237) issued in PCT Application No. PCT/JP2015/085732 dated Mar. 15, 2016 (three pages).
Chinese-language Office Action issued in counterpart Chinese Application No. 201580078740.X dated Aug. 28, 2018 (five (5) pages).
Extended European Search Report issued in counterpart European Application No. 15888547.5 dated Oct. 12, 2018 (eight (8) pages).

* cited by examiner

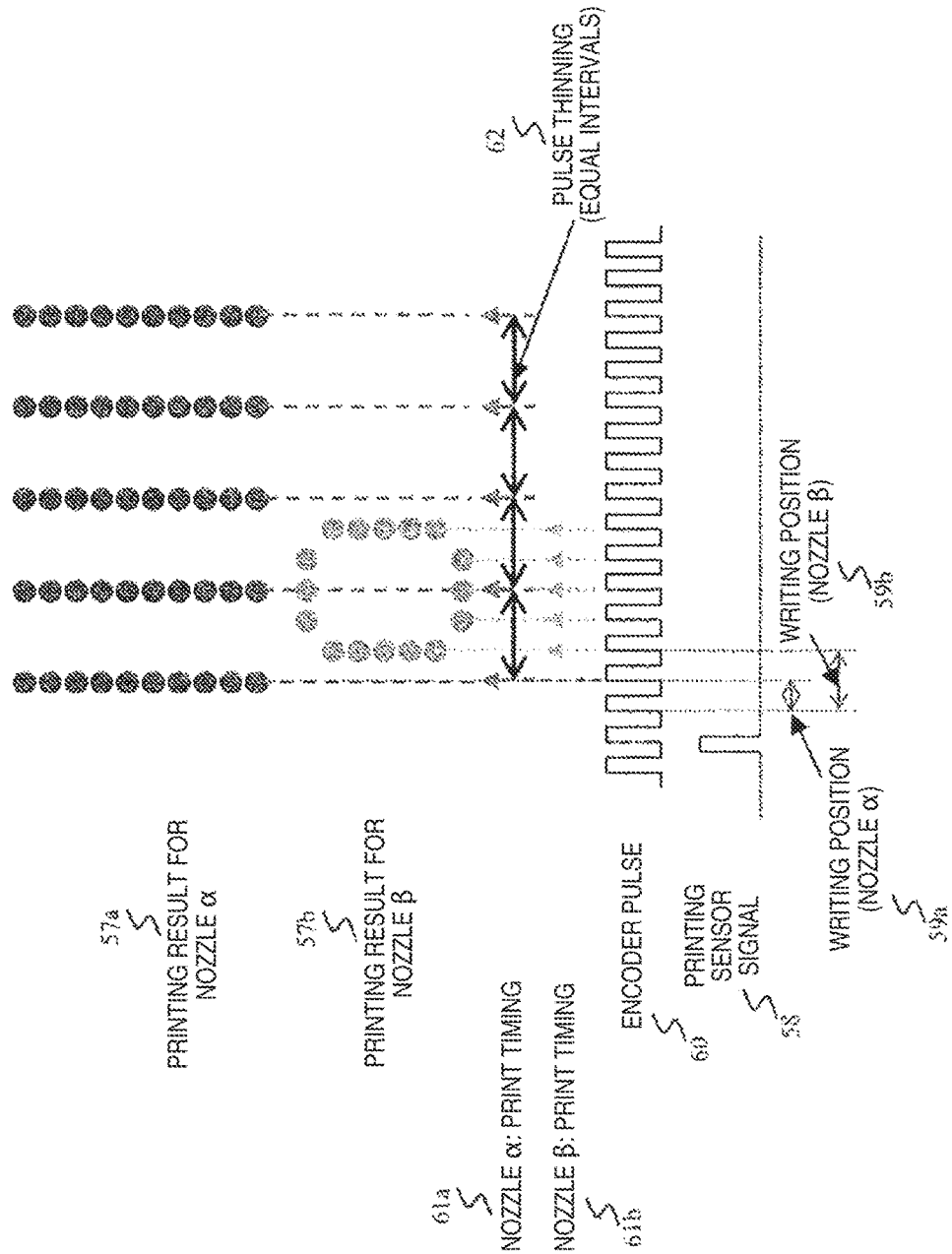

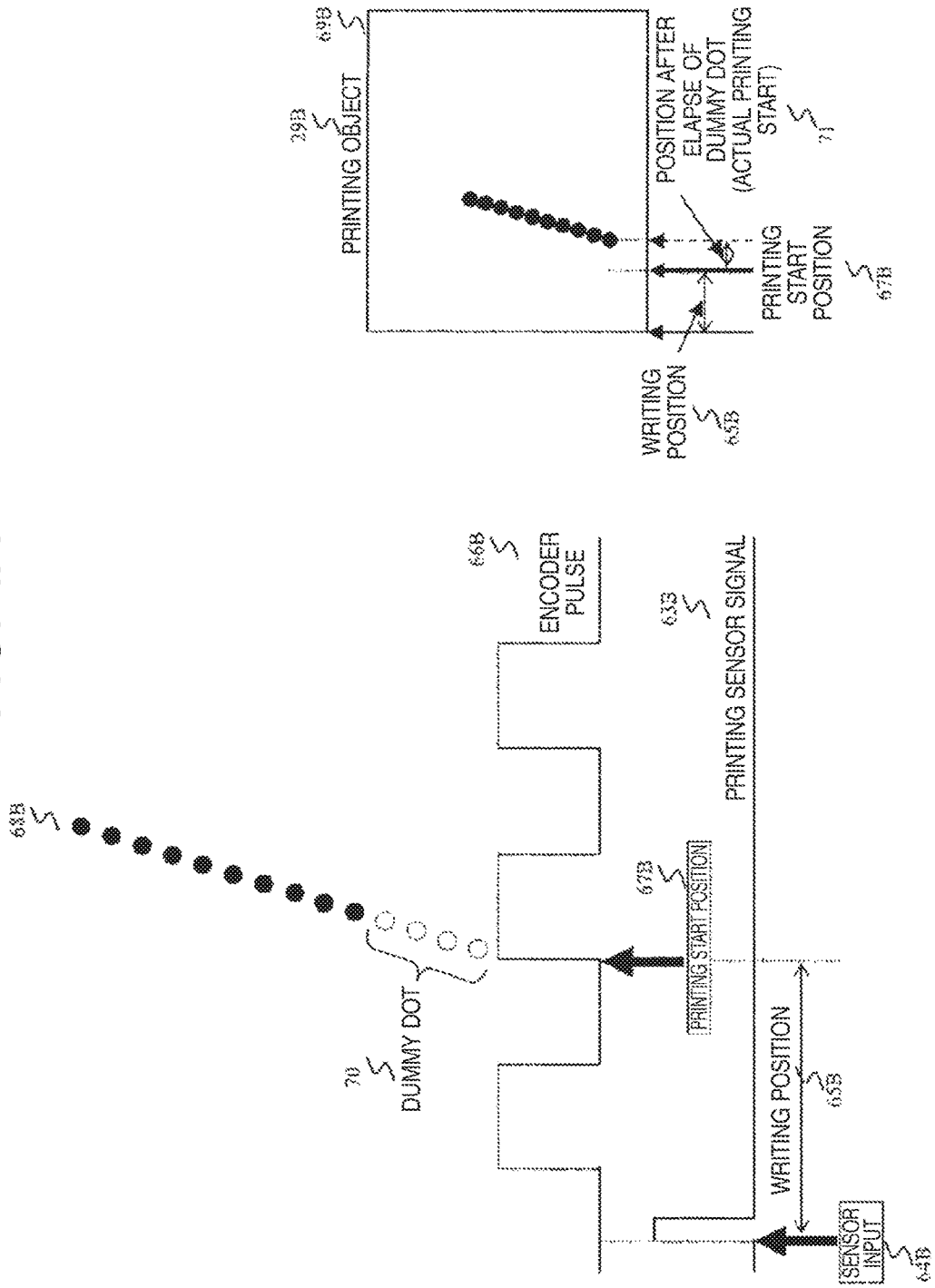

FIG. 5B

85A
PRINT SETTING
DIFFERENT PITCH CONTROL    NO
86

85B
PRINT SETTING
DIFFERENT PITCH CONTROL         YES
86
DIFFERENT PITCH CONTROL SYSTEM   FREQUENCY DIVISION SYSTEM    DOT SYSTEM
87
FREQUENCY DIVISION THINNING RATE    1/    0 0 2    (1/1 ~ 1/999)
88

85C
PRINT SETTING
DIFFERENT PITCH CONTROL         YES
86
DIFFERENT PITCH CONTROL SYSTEM   FREQUENCY DIVISION SYSTEM    DOT SYSTEM
87
INSERTED DOT NUMBER OF FIRST LINE    0 0 0
89
HALFWAY-INSERTED DOT LINE            0 0 0
90

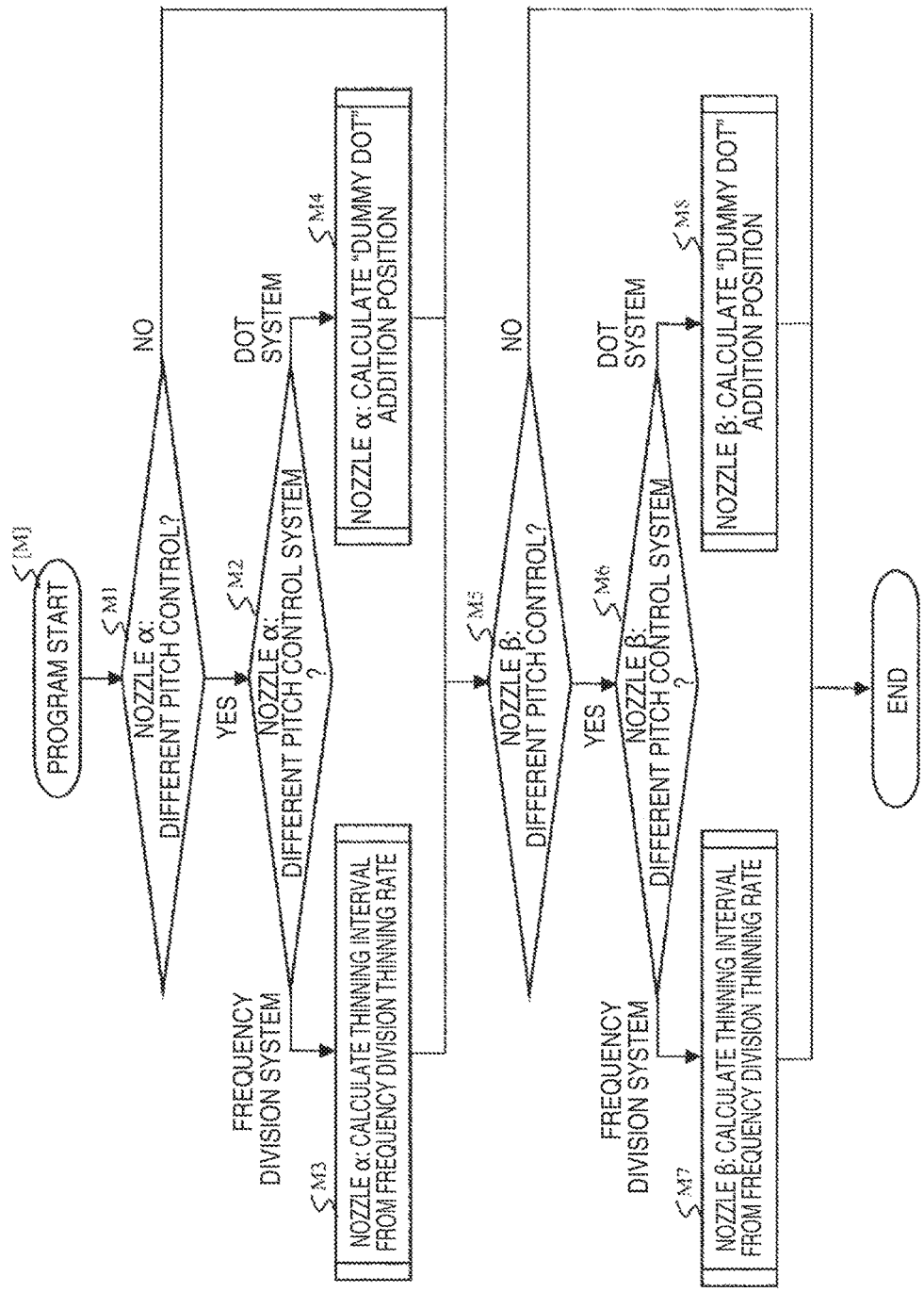

INK JET RECORDING APPARATUS

TECHNICAL FIELD

The present invention relates to an ink jet recording apparatus of a charging control system.

BACKGROUND ART

An example of the background art of this technical field is JP 2010-228402 A (Patent Literature 1).

Patent Literature 1 describes that "it becomes possible to provide an ink jet recording apparatus which can set writing time for each nozzle and therefore can eliminate deviation in writing positions between nozzles." (see Abstract)

CITATION LIST

Patent Literature

PATENT LITERATURE 1: JP 2010-228402 A

SUMMARY OF INVENTION

Technical Problem

A conventional technique disclosed in Patent Literature 1 controls ink discharge timing for each nozzle based on a pulse of one common encoder.

On the other hand, in a case where nozzles are set to have different character widths or particle usage rates, two nozzles which respectively eject ink in synchronization width an encoder pulse have equal printing pitches. Accordingly, there arises a problem that printing result of a narrow printing pitch lengthens when printing with an encoder pulse corresponding to a nozzle having a wide printing pitch as illustrated in FIG. 2(a), or printing result of a wide printing pitch shortens when printing with an encoder pulse corresponding to a nozzle having a narrow printing pitch as illustrated in FIG. 2(b).

Hence, the object of the present invention is to provide an ink jet recording apparatus which can improve printing quality and include printing variety when printing in case of using different printing pitch with a plurality of nozzles.

Solution to Problem

With the aim of solving the above problem, a structure described in any of the appended Claims is employed, for example. The present application includes a plurality of solutions to the above problem, and one example of them is an ink jet recording apparatus configured to perform printing control with a plurality of nozzles using an encoder pulse outputted from an encoder attached to a conveying line, the ink jet recording apparatus including: an input unit configured to separately set a printing character width for each of the plurality of nozzles; and a control unit configured to control printing of a character width corresponding to input information from the input unit.

Advantageous Effects of Invention

It is possible with the present invention to provide an ink jet recording apparatus which can improve printing quality and include printing variety when printing in case of using different printing pitch with a plurality of nozzles.

BRIEF DESCRIPTION OF DRAWINGS

FIG. 3A illustrates an example of printing result of a case of performing thinning printing of an encoder pulse according to first embodiment.

FIG. 4A is a print image of a case where dummy dots are inserted according to second embodiment.

FIG. 5B illustrates screens for selecting whether different pitch printing control between twin nozzles is to be executed or not.

FIG. 5C is a flow chart M at the time of executing different pitch printing control between twin nozzles.

DESCRIPTION OF EMBODIMENTS

Embodiment 1

The following description will explain an embodiment of the present invention.

Figure 1A:
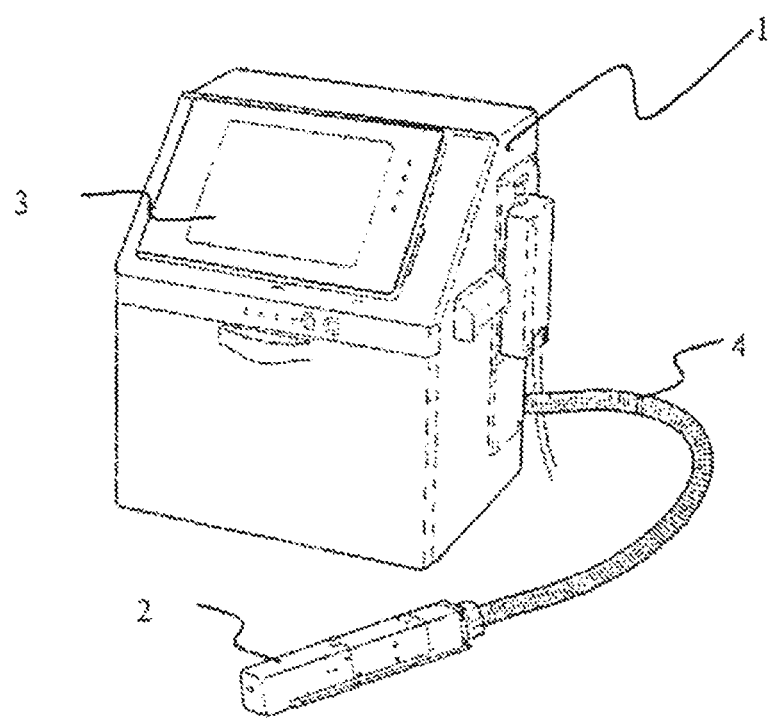
FIG. 1A is an external perspective view of an ink jet recording apparatus having twin nozzles.
Figure 1B:
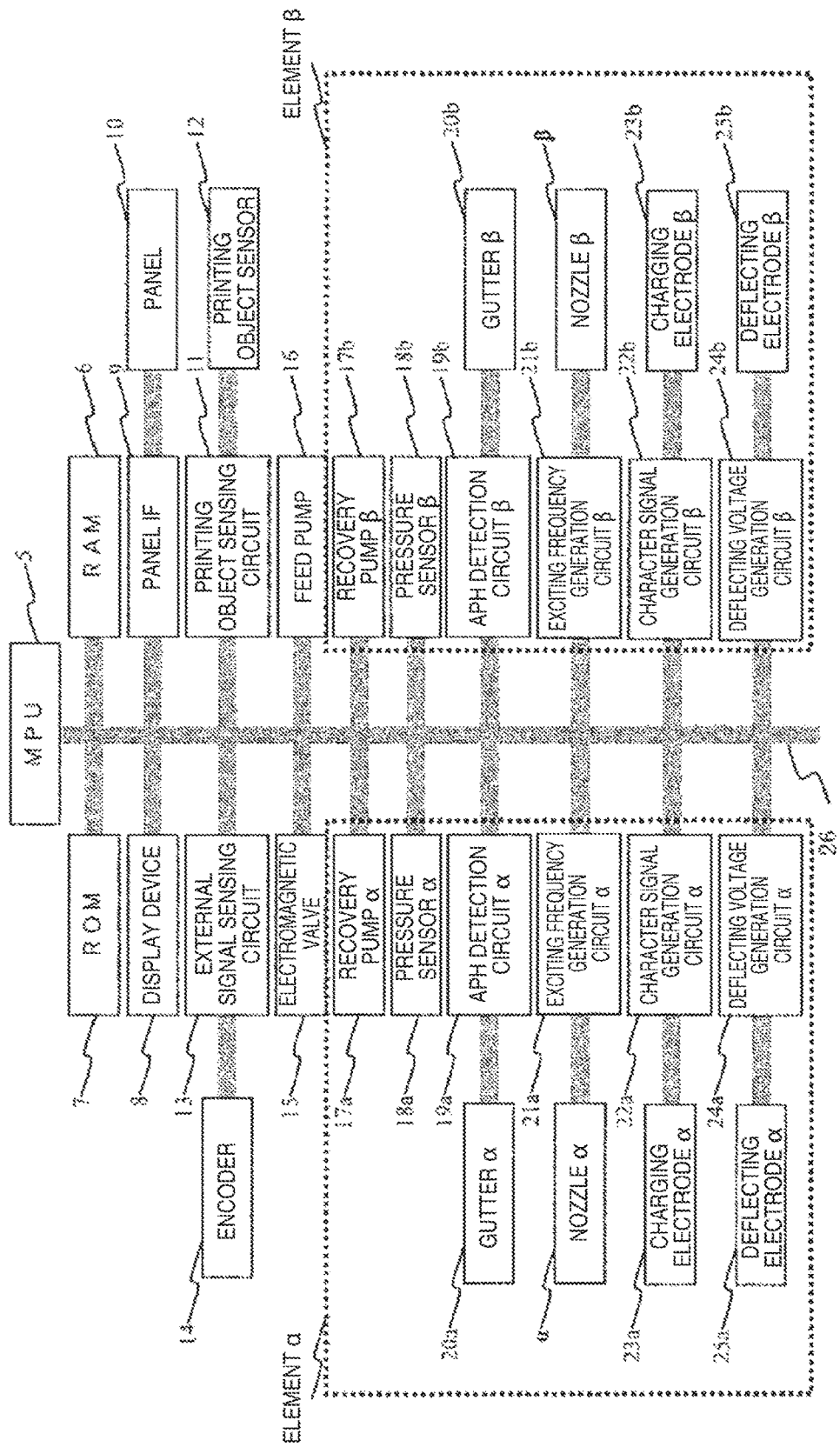
FIG. 1B is a system block diagram illustrating the overall structure of an ink jet recording apparatus.
Figure 1C:
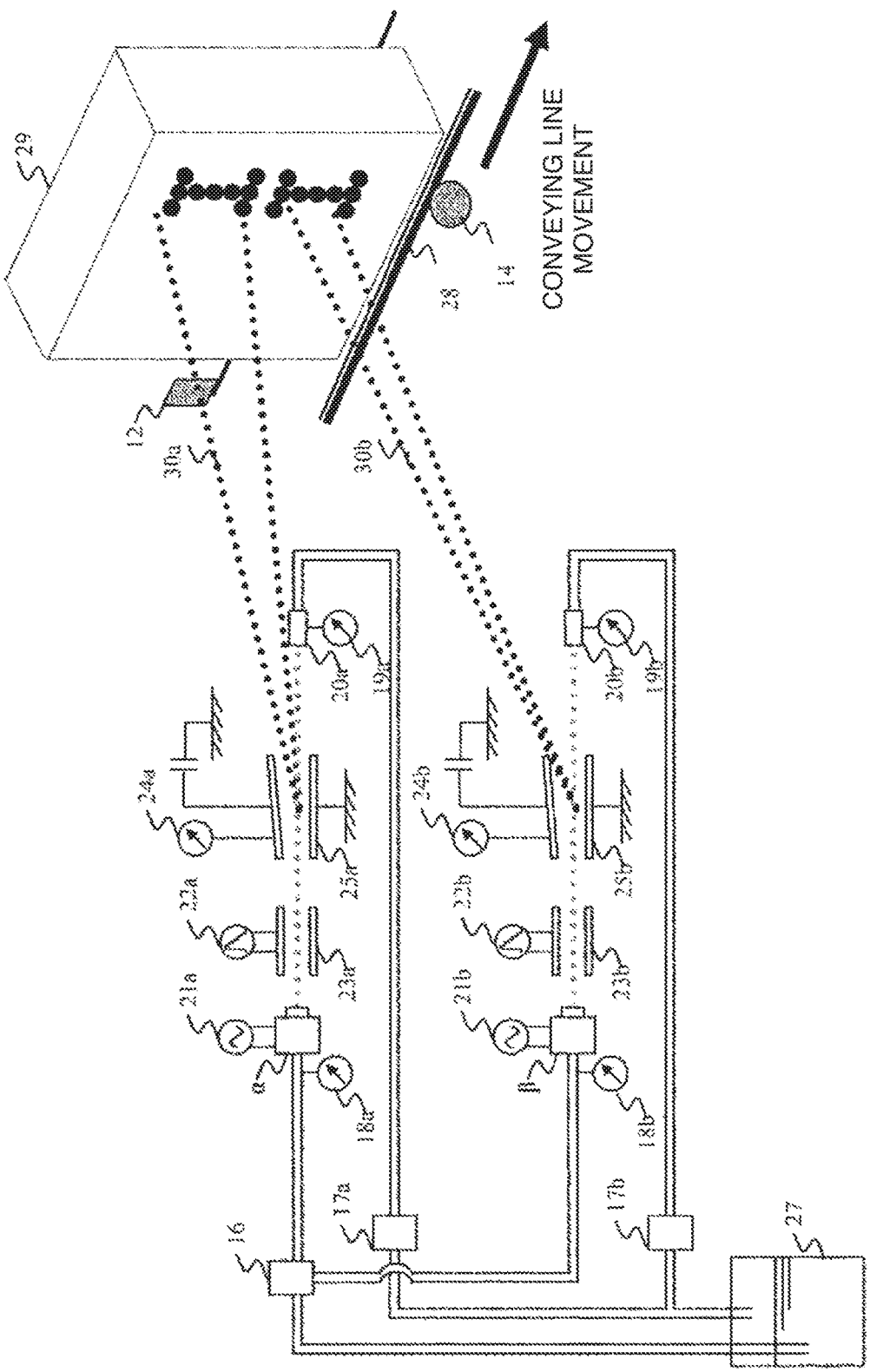
FIG. 1C illustrates printing operations of a case where twin nozzles are arranged in the vertical direction.
Figure 2A:
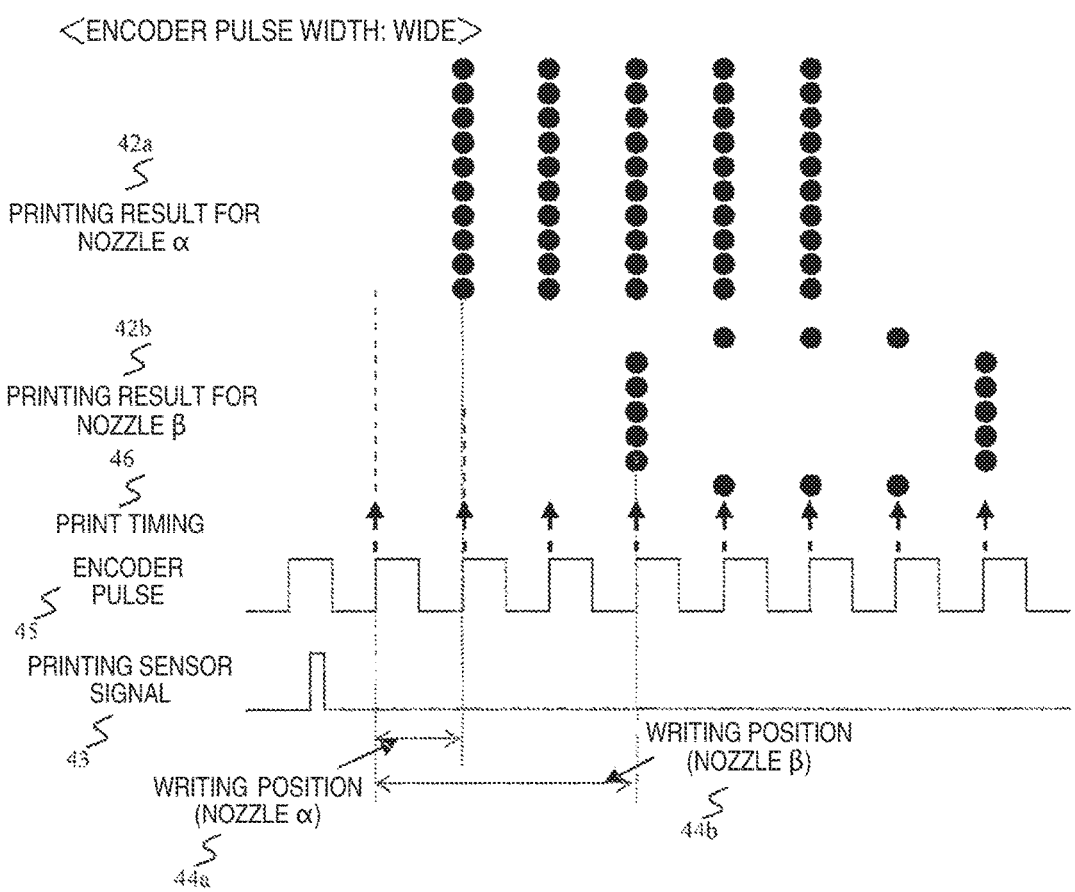
FIG. 2A illustrates an example of printing result when printing is performed with an encoder by conventional twin nozzles. (Encoder pulse: wide)
Figure 2B:
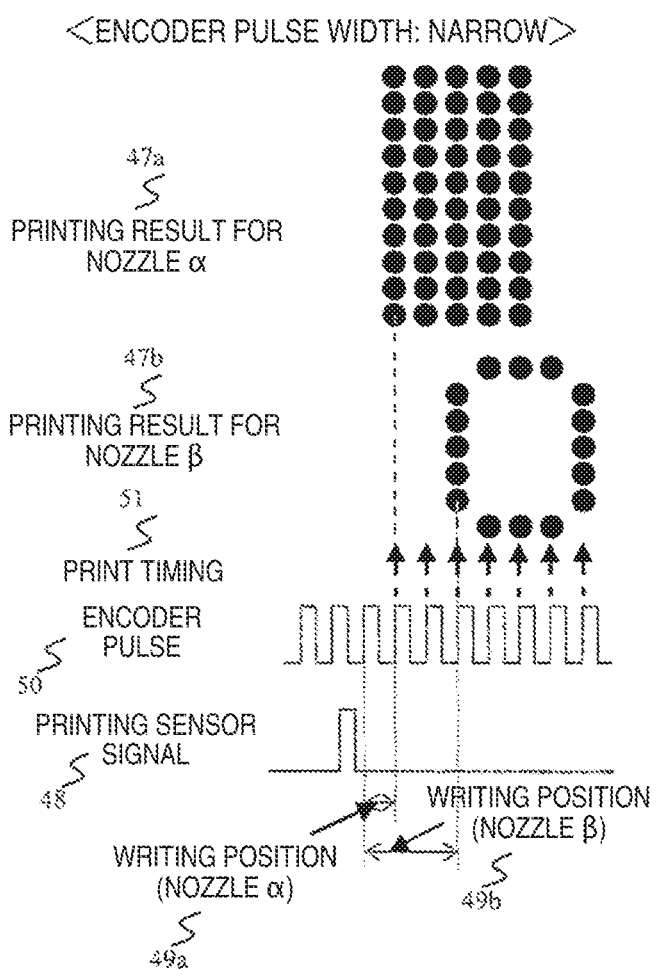
FIG. 2B illustrates an example of printing result when printing is performed with an encoder by conventional twin nozzles. (Encoder pulse: narrow)

FIG. 1(a) is an external perspective view of an ink jet recording apparatus having twin nozzles. FIG. 1(b) is a system block diagram illustrating the overall structure of an ink jet recording apparatus of FIG. 1(a). FIG. 1(c) is a configuration diagram for explaining printing operations of a case where twin nozzles of an ink jet recording apparatus are arranged in the vertical direction.

Referring to the external perspective view of an ink jet recording apparatus in FIG. 1(a), an ink jet recording apparatus body 1 has a display panel 3 located on an upper part of the outer surface of the apparatus body, and is provided with a print head 2, which has twin nozzles, outside the apparatus body. It is shown that the apparatus body 1 and the print head 2 are connected with each other via a conduit 4.

Referring to the system block diagram illustrating the overall structure of the ink jet recording apparatus in FIG. 1(b), the ink jet recording apparatus body 1 has: a Micro Processing Unit (MPU) 5 configured to control the overall operations; a Random Access Memory (RAM) 6 of a temporary data recording unit; a Read Only Memory (ROM) 7 of a program storing unit; a display device 8 configured to display information such as printing contents; a panel IF (Interface) 9; a panel 10 on which printing information or printing data for fine adjustment is inputted; a printing object sensing circuit 11; a printing object sensor 12 configured to sense a printing object; an external signal sensing circuit 13; an encoder 14 configured to acquire the speed of a conveying line; an electromagnetic valve 15 to be used in a path in the apparatus body through which ink and a solvent are fed or recovered; a feed pump 16 configured to feed ink; and various devices to be used for printing control located in a nozzle α or a nozzle β of twin nozzles, or in both of the nozzles α and β.

Regarding the nozzle α, various devices to be used for printing control mean: a recovery pump α 17a to be used for recovering ink from a gutter α (20a); a pressure sensor α 18a configured to measure the pressure of a front stage of the nozzle α; an automatic phase (APH) detection circuit α 19a configured to detect the most suitable charging timing for ink particles which eject from the nozzle α; a gutter α 20a configured to discover ink particles which have ejected from the nozzle α and are not used for printing; an exciting frequency generation circuit α 21a configured to apply to the nozzle α in order to create ink particles from the nozzle α; a character signal generation circuit α 22a configured to generate a character signal to be used for printing on a printing object with the nozzle α; a charging electrode α 23a configured to charge a character signal to an ink particle of the nozzle α; a deflecting voltage generation circuit α 24a configured to apply deflecting voltage to a deflecting electrode α (25a); and a deflecting electrode α 25a.

The nozzle β similarly has a recovery pump β 17b, a pressure sensor β 18b, an APH detection circuit β 19b, a gutter β 20b, an exciting frequency generation circuit β 21b, a character signal generation circuit β 22b, a charging electrode β 23b, a deflecting voltage generation circuit β 24b and a deflecting electrode β 25b. These are connected with each other via a bus 26 configured to transmit and receive signals.

In the ink jet recording apparatus, the MPU 5 controls the RAM 6, the ROM 7, the display device 8, the panel 10, the printing object sensing circuit 11, the feed pump 16, the recovery pumps 17a and 17b, the pressure sensors 18a and 18b, the APH detection circuits 19a and 19b, the gutters 20a and 20b, the exciting frequency generation circuits 21a and 21b, the nozzles α and β, the character signal generation circuits 22a and 22b, the charging electrodes 23a and 23b, the deflecting voltage generation circuits 24a and 24b, the deflecting electrodes 25a and 25b, and the like via the bus 26.

The ROM 7 stores a program to be used for controlling the ink jet recording apparatus, and the MPU 5 controls the respective parts based on this program. The panel 10 is of a touch panel system wherein data can be inputted on a screen, and inputted data is stored and retained in the RAM 6.

Next, printing operations of the ink jet recording apparatus wherein two nozzles α and β print on a printing object 29, which is a product located on a conveying line 28, will now be described using FIG. 1(c).

First, the printing object sensor 12 senses the position of the printing object 29 which is a product. Next, ink fed from an ink container 27 by the feed pump 16 flows through the nozzles α and β. At this time, ink in the nozzle α is excited by the exciting frequency generation circuit 21a so that ink particles 30a are formed, and charging voltage is generated by the character signal generation circuit 22a in accordance with print data on the RAM 6 and is applied at the charging electrode 23a. The charging voltage to be applied at the charging electrode 23a varies depending on contents to be printed.

Charged ink particles 30 deflect in accordance with charging voltage applied when the ink particles 30 flow through the deflecting electrode 25a to which deflecting voltage outputted from the deflecting voltage generation circuit 24a is applied, and print dots are formed on the printing object 29, which is a product, so as to perform printing. Ink particles 30a, which have not been charged and are not used for printing, are discovered from the gutter 20a by the recovery pump 17a, and return to the ink container 27. Printing at the nozzle β is also executed by similar control.

Here, for setting and changing printing data or various printing conditions to be used for printing, the MPU 5 analyzes information obtained from an input unit such as the panel 10 or the external signal sensing device 13 and data of the RAM 6 using a program in the ROM 7, and changes the settings. After the settings are changed, values obtained after changing are stored and retained in the RAM 6, and current settings are displayed on the display device 8 or the external signal sensing device 13.

In order to perform printing with an encoder of printing according to the speed of the conveying line 28, printing is executed in synchronization with an encoder pulse obtained from the encoder 14 since this encoder pulse indicates change in the speed of the conveying line 28.

That is, charging voltage is applied from the character signal generation circuit 22 to one vertical dot line of ink particles 30, which flow through the charging electrode 23, in edge detection timing of an encoder pulse inputted from the encoder 14. Printing is then performed by deflecting the ink particles 30 according to charging voltage applied when the ink particles 30 flow through the deflecting electrode 25.

Figure 3B:
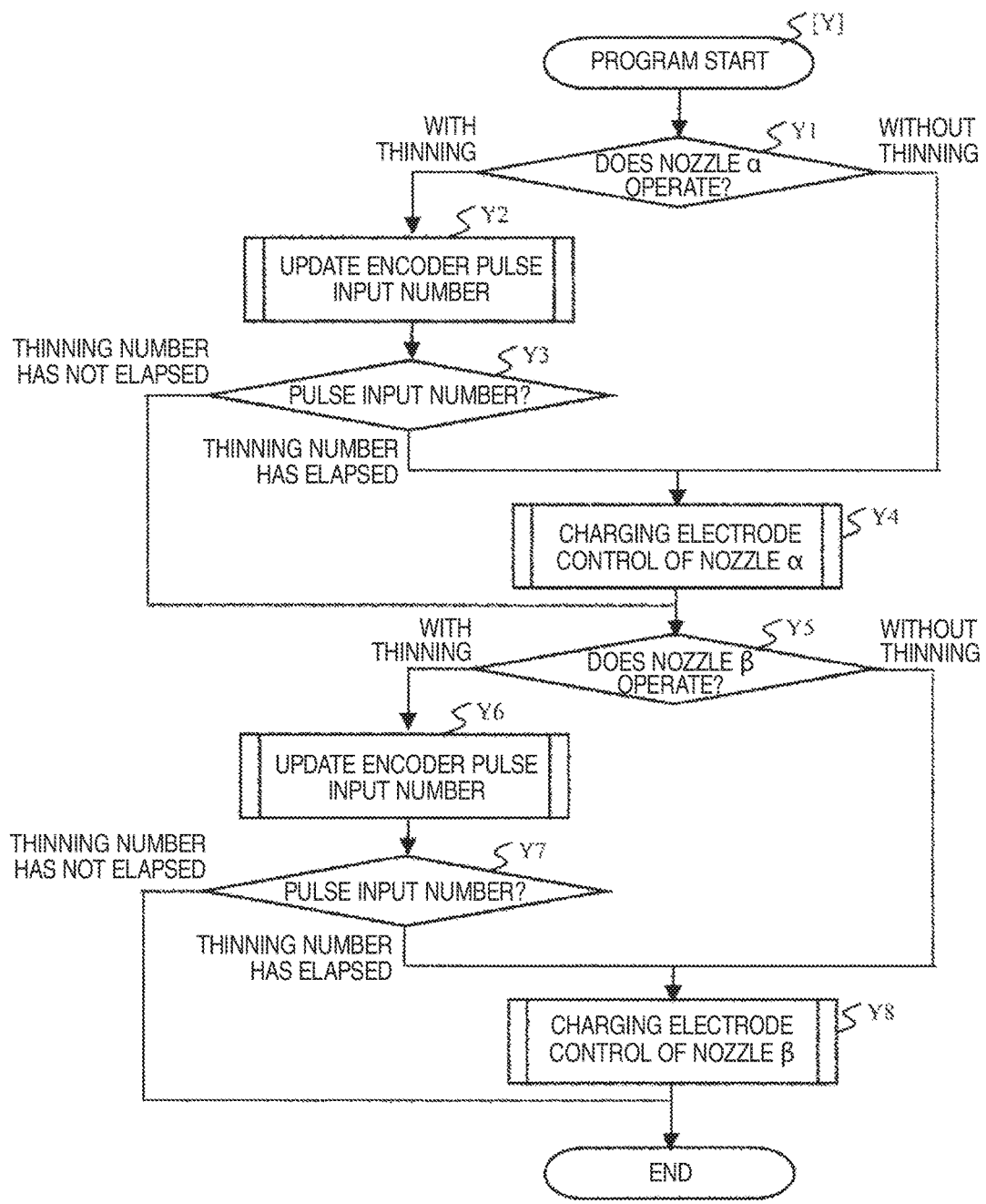
FIG. 3B is a printing flow chart Y at the time of encoder pulse inputting.

First embodiment of character width control between nozzles in twin nozzle printing using an encoder will now be described using FIGS. 3(a) and 3(b). FIG. 3(a) illustrates an example of printing result of a case where printing is performed by controlling the width of a character to be printed based on the number of pulses of an encoder pulse. Here, it is assumed that thinning (frequency division thinning) means to adjust the character width based on the number of pulses of an encoder pulse.

In this method, a printing pitch (character width) of each nozzle is preliminarily calculated before executing printing, and an encoder pulse from the conveying line 28 is used for printing without modification in a case where the encoder pulse is not to be thinned, or an encoder pulse from the conveying line 28 is thinned by a required integral number before being used for printing in a case where the encoder pulse is to be thinned.

It is assumed in FIG. 3(a) that a character to be printed by the nozzle α is composed of five lines, each line having ten vertical dots, while a character to be printed by the nozzle β is composed of five lines, each line having seven vertical dots. It is also assumed that whether an encoder pulse is to be thinned or not can be set for each nozzle, and FIG. 3(a) shows a case where an encoder pulse for the nozzle α is thinned while an encoder pulse for the nozzle β is not thinned.

Since the encoder 14 and the printing object sensor 12 are identical, the motion of the encoder pulse and a printing sensor signal 53 start in the same timing, and a printing result 57a for the nozzle α is printed in timing of a print timing 61a after an encoder pulse 60 counts a lapse of a writing position 59a from when a printing sensor signal 58 sensed by the printing object sensor 12 is inputted.

At this time, the print timing 61a is timing obtained by thinning the encoder pulse 60 by an integral multiple, and a pulse thinning interval 62 is constant. Here, printing is performed with a setting that a vertical dot line of a character to be printed by the nozzle α is printed three encoder pulses at a time.

On the other hand, a printing result 57b for the nozzle β is printed in timing of a print timing 61b after the encoder pulse 60 counts an elapse of a writing position 59b from when a printing sensor signal 58 sensed by the printing object sensor 12 is inputted.

Here, since the print timing 61b is not thinned, printing is performed with a setting that a vertical dot line of a character to be printed by the nozzle β is printed one encoder pulse at a time.

FIG. 3(b) is a printing flow chart Y for thinning printing of an encoder pulse of this embodiment. When an encoder pulse of the encoder 14 is inputted into the external signal sensing circuit 13, the MPU 5 first determines whether frequency division thinning is to be performed for the nozzle α or not in step Y1.

In a case where frequency division thinning is to be performed for the nozzle α, the number of inputs of an encoder pulse is counted up on the basis of a first-time print timing 61a in step Y2, and whether the number of inputs of an encoder pulse has reached a thinning number or not is checked in step Y3.

When the number of inputs of an encoder pulse has reached the thinning number, which means that it is the next print timing 61a after an elapse of the thinning interval 62, the MPU 5 judges to print with the nozzle α without thinning an encoder pulse, and performs processing of controlling the character signal generation circuit 22a of the nozzle α to generate charging voltage and apply the charging voltage to the charging electrode 23a in step Y4.

When the number of inputs of an encoder pulse has not reached the thinning number, which means that it is not a print timing 61a, the MPU 5 thins the encoder pulse and does not print with the nozzle α. In a case where frequency division thinning is not to be performed for the nozzle α, step Y4 is executed after step Y1, and the MPU 5 performs processing of controlling the character signal generation circuit 22a of the nozzle α to generate charging voltage and apply the charging voltage to the charging electrode 23a.

The MPU 5 then determines whether frequency division thinning is to be performed for the nozzle β or not in step Y5. In a case where frequency division thinning is to be performed for the nozzle β, the number of inputs of an encoder pulse is counted up on the basis of a first-time print timing 61b in step Y6, and whether the number of inputs of an encoder pulse has reached a thinning number or not is checked in step Y7.

When the number of inputs of an encoder pulse has reached the thinning number, which means that it is the next print timing 61b after an elapse of the thinning interval 62, the MPU 5 judges to print with the nozzle β without thinning an encoder pulse, and performs processing of controlling the character signal generation circuit 22b of the nozzle β to generate charging voltage and apply the charging voltage to the charging electrode 23a in step Y8.

When the number of inputs of an encoder pulse has not reached the thinning number, which means that it is not a print timing 61b, the MPU 5 thins the encoder pulse and does not print with the nozzle β.

In a case where frequency division thinning is not to be performed for the nozzle β, step Y8 is executed after step Y5, and the MPU 5 performs processing of controlling the character signal generation circuit 22b of the nozzle β to generate charging voltage and apply the charging voltage to the charging electrode 23b. It is to be noted that the printing flow chart Y is stored in the ROM 7, and the MPU 5 invokes the printing flow chart Y and performs control as required.

By thinning an encoder pulse in printing as described above, it is possible to perform control in such a manner that a plurality of nozzles have different character widths even in a case of printing using a common encoder, and it is possible to improve printing quality when printing with a plurality of nozzles.

Embodiment 2

Second embodiment of character width control between nozzles in twin nozzle printing using an encoder will now be described using FIGS. 4(a), 4(b) and 4(c). This embodiment is configured to interpose a dummy dot, which is not used for printing, in front of a dot, which is actually used for printing, so as to separately control the character width for each nozzle.

First, the mechanism of inserting a dummy dot, which is not used for printing, so as to control the print timing will now be described using FIG. 4(a). FIG. 4(a) illustrates an example wherein four dummy dots are inserted in front of a dot of an ink particle which is used for printing.

When a printing object 29B is sensed by the printing object sensor 12, a printing sensor signal 63B from the printing object sensor 12 is inputted into the ink jet recording apparatus as a sensor input 64B. The ink jet recording apparatus counts an encoder pulse 66B after an elapse of a writing position 65B, and then recognizes the next encoder pulse after counting as a printing start position 67B.

Before an ink particle 68B is actually ejected from the printing start position 67B, four dummy dots 70 are ejected. This causes delay of an actual printing start position 71 by the air travel time of the dummy dots, and therefore the printing position of a printing result 69B deviates from that of a printing result 69A.

By using dummy dots in such a manner, it is possible to change an actual printing start position. A dummy dot can be set by two methods: one for each dot, and one for each line.

An example of printing character width control for each nozzle using a dummy dot in twin nozzle printing will now be described using FIG. 4(b).

Figure 4B:
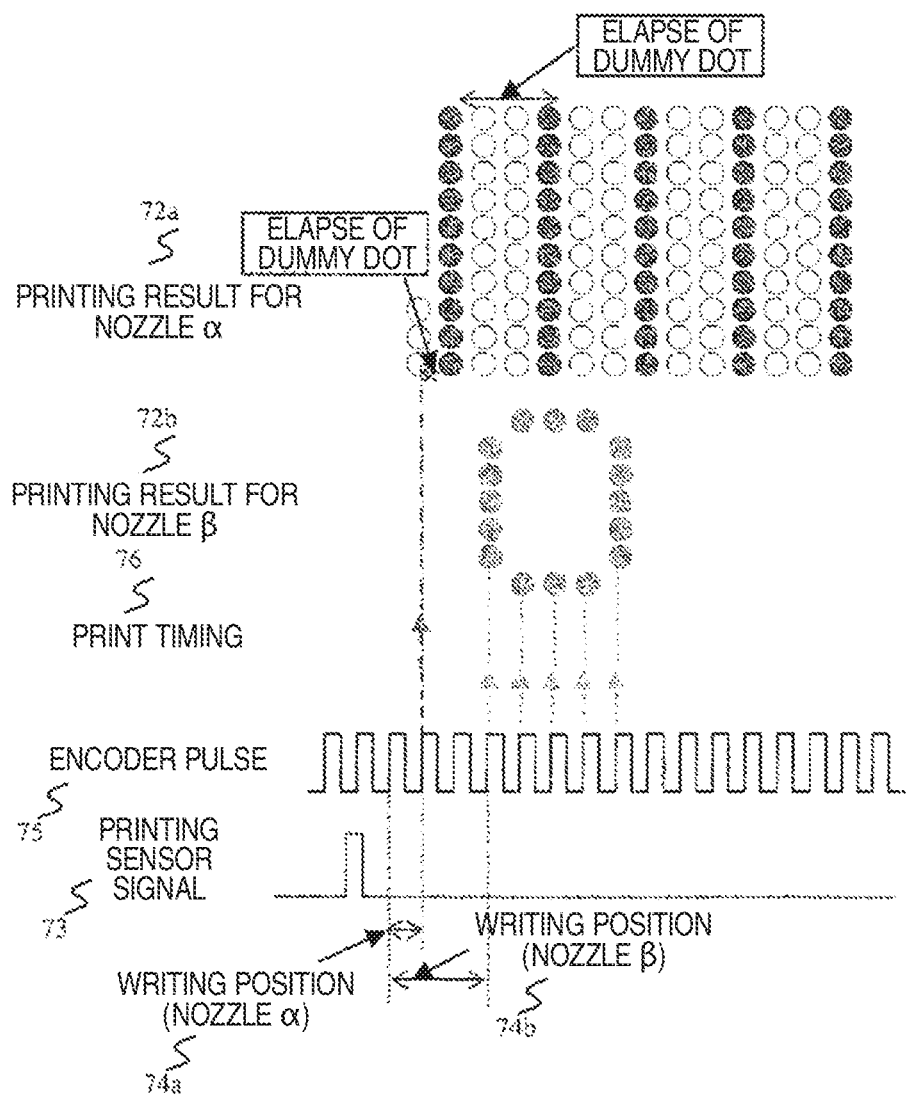
FIG. 4B illustrates an example of printing result of a case where dummy dots are interposed.

Referring to FIG. 4(b), a dummy dot is inserted to control the character width in printing with the nozzle α, while no dummy dot is inserted and printing is performed based on an encoder pulse in printing with the nozzle β.

In this method, the printing pitch of each nozzle is preliminarily calculated, and an encoder pulse from the conveying line 28 is used for printing without modification in a case where a dummy dot is not to be interposed, or a dummy dot is put into any position between ink particles and used in a case where a dummy dot is to be interposed. Since the encoder 14 and the printing object sensor 12 are identical, the motion of an encoder pulse and the printing sensor signal 53 start in the same timing.

In a case where a dummy dot is to be interposed for the nozzle α, a printing result 72a for the nozzle α is printed in timing of a print timing 76a after an encoder pulse 75 counts an elapse of a writing position 74a from when a printing sensor signal 73 sensed by the printing object sensor 12 is inputted.

Here, three dummy dots are inserted to the printing start position, and two lines of dummy dots are inserted between printing lines.

On the other hand, in a case where a dummy dot is not to be interposed for the nozzle β, a printing result 72b for the nozzle β is printed in timing of a print timing 76b after an encoder pulse 75 counts an elapse of a writing position 74b from when a printing sensor signal 73 sensed by the printing object sensor 12 is inputted. Here, since the print timing 61b is not thinned, printing is performed with a setting that a vertical dot line of a character to be inputted with the nozzle β is printed one encoder pulse at a time.

Figure 4C:
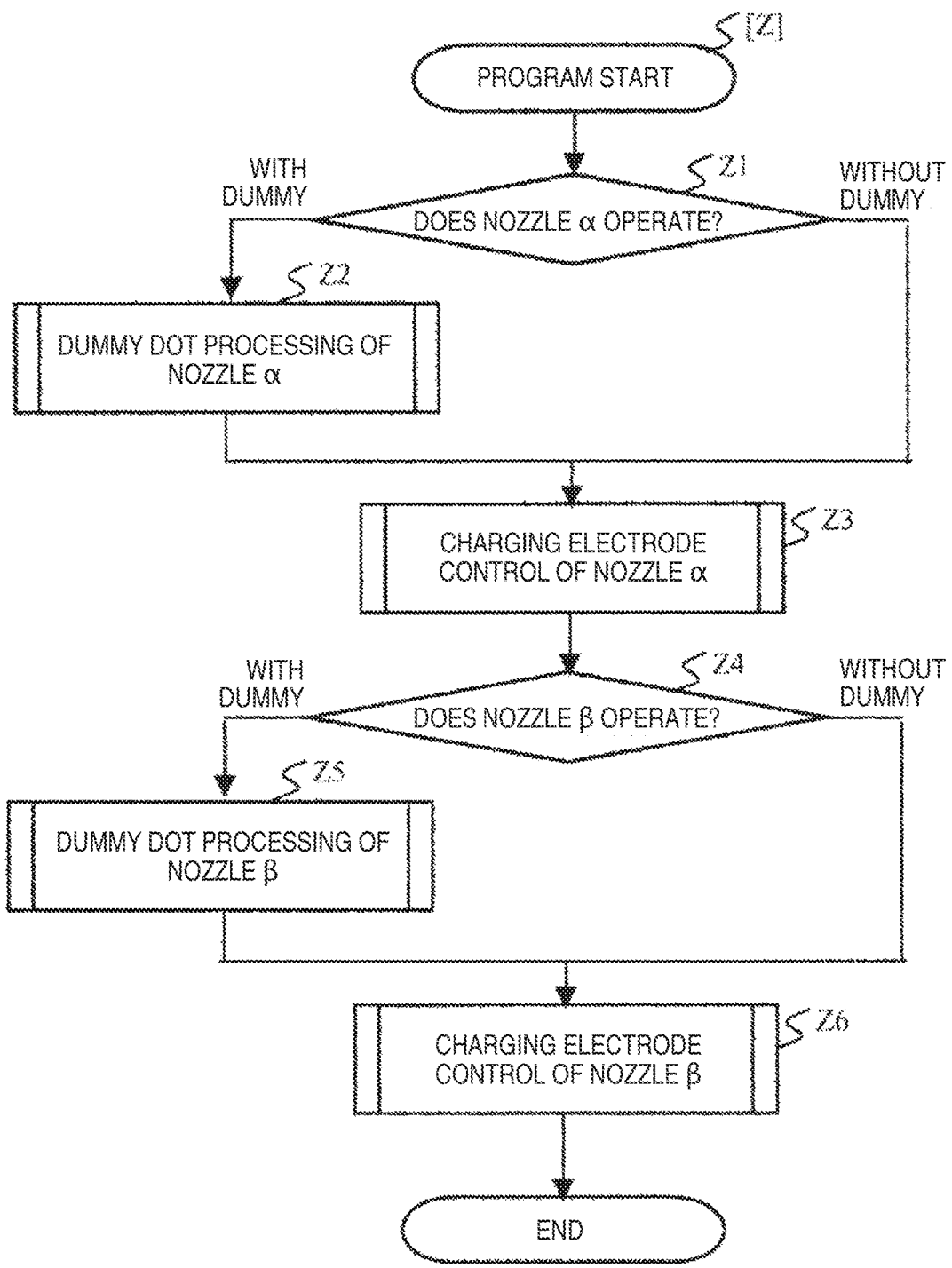
FIG. 4C is a printing flow chart Z at the time of encoder pulse inputting.

FIG. 4(c) is a printing flow chart Z for printing using a dummy dot of this embodiment. When an encoder pulse of the encoder 14 is inputted into the external signal sensing circuit 13, the MPU 5 first determines whether the nozzle α is to interpose a dummy dot or not in step Z1.

In a case where the nozzle α is to interpose a dummy dot, the MPU 5 judges to interpose a dummy dot and print with the nozzle α, executes dummy dot interposing processing to the printing content of the nozzle α in step Z2, and then performs processing of controlling the character signal generation circuit 22a of the nozzle α to generate charging voltage and apply the charging voltage to the charging electrode 23a in step Z3.

In a case where the nozzle α is not to interpose a dummy dot, step Z3 is executed after step Z1, and the MPU 5 performs processing of controlling the character signal generation circuit 22a of the nozzle α to generate charging voltage and apply the charging voltage to the charging electrode 23a.

Then, in a case where the nozzle β is to interpose a dummy dot in step Z4, the MPU 5 judges to interpose a dummy dot and print with the nozzle β, executes dummy dot interposing processing to the printing content of the nozzle β in step Z5, and then performs processing of controlling the character signal generation circuit 22b of the nozzle β to generate charging voltage and apply the charging voltage to the charging electrode 23b in step Z6.

In a case where the nozzle β is not to interpose a dummy dot, step Z6 is executed after step Z4, and the MPU 5 performs processing of controlling the character signal generation circuit 22b of the nozzle β to generate charging voltage and apply the charging voltage to the charging electrode 23b. It is to be noted that the printing flow chart Z is stored in the ROM 7, and the MPU 5 invokes the print flow chart Z and performs control as required.

By inserting a dummy dot and controlling printing as described above, it is possible to perform control in such a manner that a plurality of nozzles have different character widths even in a case of printing using a common encoder in printing with a plurality of nozzles, and it is possible to improve printing quality when printing with a plurality of nozzles.

Embodiment 3

A function of selecting character width control between twin nozzles from character width control described in first embodiment and character width control described in second embodiment will now be described in this embodiment.

Figure 5A:
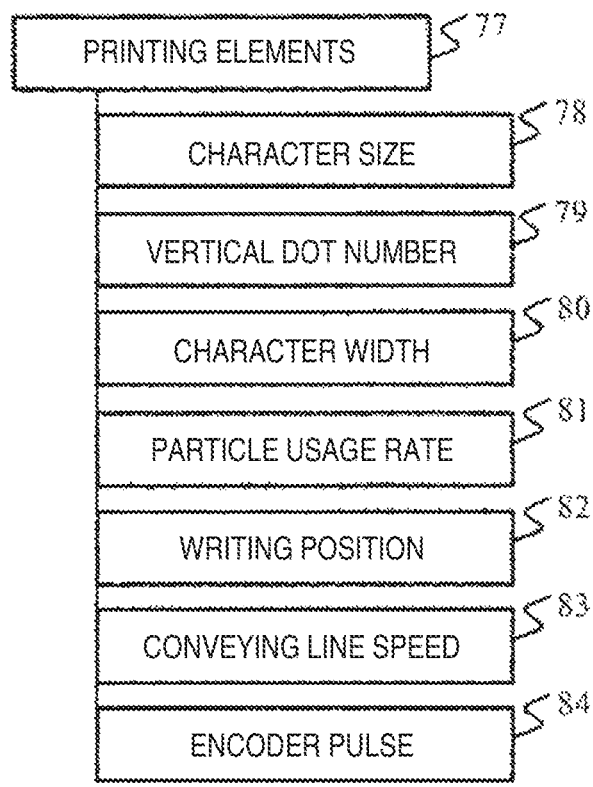
FIG. 5A illustrates printing elements required for printing.

FIG. 5(a) illustrates printing elements 77 required for printing, including elements, which compose a printing pitch, such as a printing character size 78, a vertical dot number 79 to be used for printing, a character width 80, a particle usage rate 81, a writing position 82, a conveying line speed 83 and an encoder pulse 84. Among them, calculation of a printing pitch uses the character size 78, the vertical dot number 79, the character width 80 and the particle usage rate 81.

FIG. 5(b) illustrates screens 85A, 85B and 85C to be used for selecting whether character width individual control (different pitch printing control) between twin nozzles is to be executed or not. The screens 85A, 85B and 85C respectively exist for the nozzles α and β, and a selection screen is provided on a screen so that different pitch printing control can be executed when required.

The screen 85A is a screen to be obtained when a choice "NO" is selected at an item "Different Pitch Control" 86, while the screens 85B and 85C are screens to be obtained when a choice "YES" is selected at the item "Different Pitch Control" 86.

When the choice of the item "Different Pitch Control" 86 is "YES", an item "Different Pitch Control System" 87 and choices "Frequency Division System" and "Dot System" are displayed on the screens 85B and 85C.

Among them, the screen 85B is a case where a choice "Frequency Division System" is selected at the item "Different Pitch Control System" 87, and an item "Frequency Division Thinning Rate" 88 is further displayed. This is a screen to be obtained when different pitch printing control is executed by thinning printing control of an encoder pulse described in Embodiment 1.

The screen 85C is a case where a choice "Dot System" is selected at the item "Different Pitch Control System" 87, and items "Inserted Dot Number in First Line" 89 and "Halfway-Inserted Dot Line" 90 are further displayed. This is a screen to be obtained when different pitch printing control is to be executed by printing control using a dummy dot described in Embodiment 1.

It is to be noted that a screen for inputting the printing elements 77 or the screens 85A, 85B and 85C are displayed at the display device 8, and the panel 10 is provided with a function with which values can be inputted. An input result is recorded in the RAM 6, and the MPU 5 invokes the input result and performs control when a program stored in the ROM 7 requires the input result.

FIG. 5(c) is a flow chart M at the time of execution of different pitch printing control. This flow chart M is executed when the ink jet recording apparatus 1 is put into "Ready-to-Print State", or when the printing content at a nozzle α or β is changed in "Ready-to-Print State".

First, in step M1, the MPU 5 determines the choice of an item "Different Pitch Control" 86a for the nozzle α. In a case where the choice is "YES", the MPU 5 further determines the choice of an item "Different Pitch Control System" 87a for the nozzle α in step M2. In a case where the choice is "Frequency Division System", the MPU 5 further calculates a thinning interval of an encoder pulse of the nozzle α from an item "Frequency Division Thinning Rate" 88a in step M3.

In a case where the choice is "Dot System", the MPU 5 further calculates a dummy dot addition position of the nozzle α from items "Inserted Dot Number of First Line" 89a and "Halfway-Inserted Dot Line" 90a in step M4.

Similarly, the MPU 5 determines the choice of an item "Different Pitch Control" 86b for the nozzle β in step M5. In a case where the choice is "YES", the MPU 5 further determines the choice of an item "Different Pitch Control System" 87b for the nozzle β in step M6. In a case where the choice is "Frequency Division System", the MPU 5 further calculates a thinning interval of an encoder pulse of the nozzle β from an item "Frequency Division Thinning Rate" 88b in step M7.

In a case where the choice is "Dot System", the MPU 5 further calculates a dummy dot addition position of the nozzle β from items "Inserted Dot Number of First Line" 89b and "Halfway-Inserted Dot Line" 90b in step M8.

Among those calculated above, the calculation result of step M3 is used in step Y2 of the flow chart Y, the calculation result of step M7 is used in step Y6 of the flow chart Y, the calculation result of step M4 is used in step Z2 of the flow chart Z, and the calculation result of step M8 is used in step Z5 of the flow chart Z.

With the above structure, it is possible to perform control in such a manner that a plurality of nozzles have different character widths even in a case of printing using a common encoder in printing with a plurality of nozzles, and it is possible to improve printing quality when printing with a plurality of nozzles.

Embodiment 4

Although the above embodiments have described a case where the writing position of the nozzle α and the writing position of the nozzle β are different from each other, the present invention can be applied to a case where the writing position of the nozzle α and the writing position of the nozzle β are the same. This will now be described using FIGS. 6(a) and 6(b).

Figure 6A:
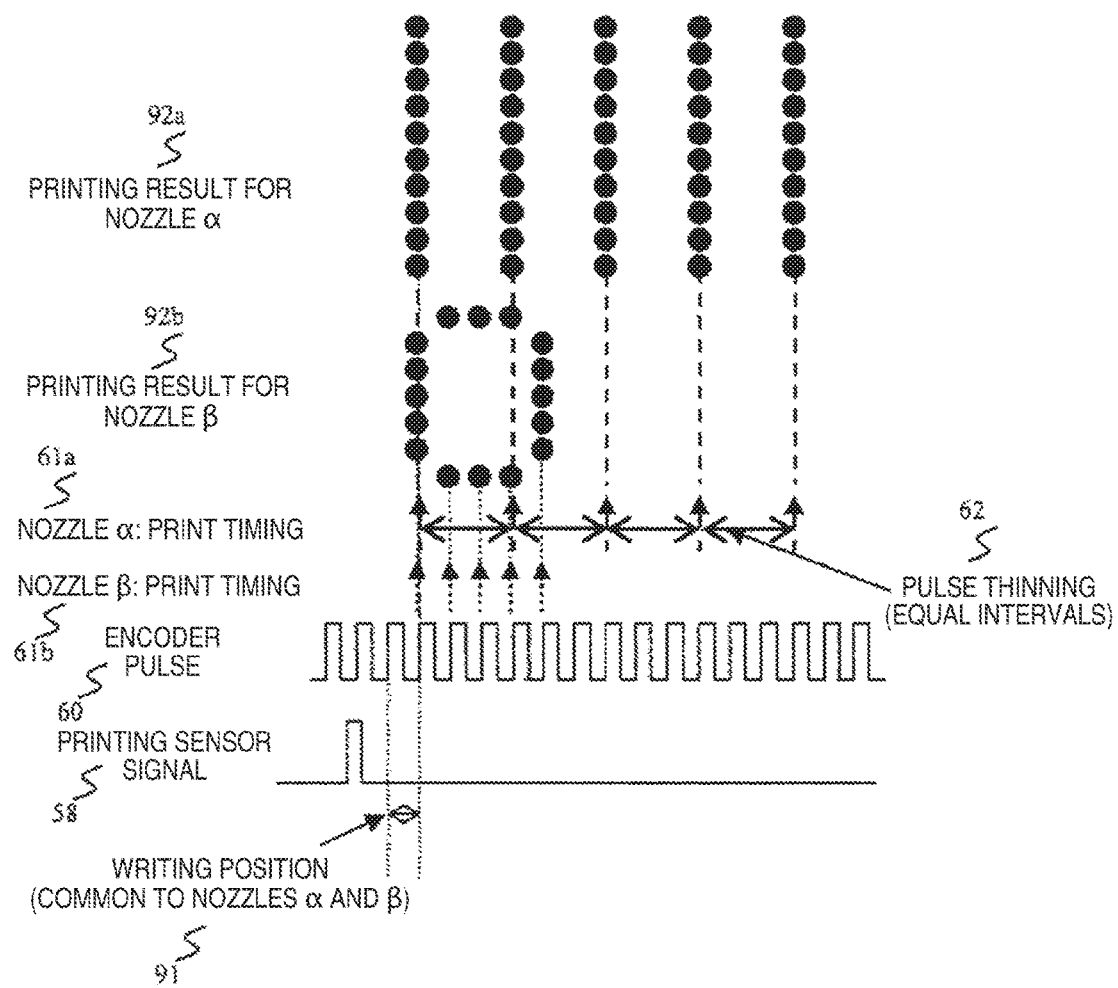
FIG. 6A illustrates an example of printing result of a case of performing thinning printing of an encoder pulse according to first embodiment when writing positions are the same.

FIG. 6(a) illustrates an example of printing result of a case where a writing position 91 of the nozzle α and a writing position 91 of the nozzle β are the same and printing is performed using the same printing conditions and printing characters as those of FIG. 3(a) of Embodiment 1 except the writing position 91. This illustrates a case where the encoder pulse of the nozzle α is thinned while the encoder pulse of the nozzle β is not thinned.

Since the encoder 14 and the printing object sensor 12 are identical, the motion of the encoder pulse and the printing sensor signal 53 start in the same timing, and a printing result 92a for the nozzle α is printed in timing of the print timing 61a after the encoder pulse 60 counts an elapse of the writing position 91 from when the printing sensor signal 58 sensed by the printing object sensor 12 is inputted. At this time, the print timing 61a is a timing obtained by thinning the encoder pulse 60 by an integral multiple, and the pulse thinning interval 62 is constant. Here, printing is performed with a setting that a vertical dot line of a character to be printed by the nozzle α is printed three encoder pulses at a time.

On the other hand, a printing result 92b for the nozzle β is printed in timing of the print timing 61b after the encoder pulse 60 counts an elapse of the writing position 91 from when the printing sensor signal 58 sensed by the printing object sensor 12 is inputted. Here, since the print timing 61b is not thinned, printing is performed with a setting that a vertical dot line of a character to be printed by the nozzle β is printed one encoder pulse at a time.

Figure 6B:
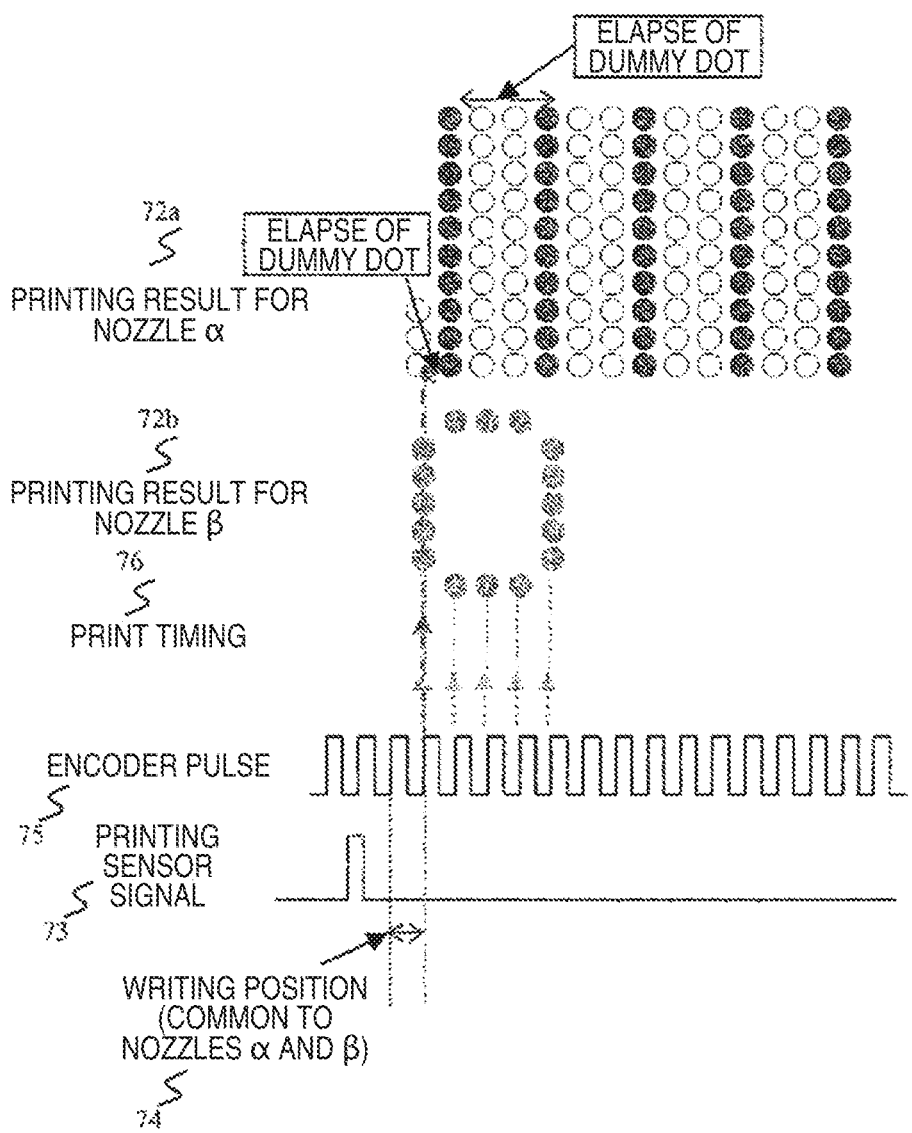
FIG. 6B illustrates an example of printing result of a case of interposing dummy dots according to second embodiment when writing positions are the same.

FIG. 6(b) illustrates an example of printing result of a case where a writing position 93 of the nozzle α and a writing position 93 of the nozzle β are the same and printing is performed using the same printing conditions and printing characters as those of FIG. 4(b) of Embodiment 2 except the writing position 93. This illustrates a case where a dummy dot is inserted to control the character width at the nozzle α while no dummy dot is inserted and printing is performed based on the encoder pulse at the nozzle β.

Since the encoder 14 and the printing object sensor 12 are identical, the motion of the encoder pulse and the printing sensor signal 53 start in the same timing, and a printing result 94a for the nozzle α is printed in timing of the print timing 76a after the encoder pulse 75 counts an elapse of the writing position 93 from when the printing sensor signal 73 sensed by the printing object sensor 12 is inputted. Here, three dummy dots are inserted to the printing start position, and two lines of dummy dots are inserted between printing lines.

On the other hand, in a case of the nozzle β where no dummy dot is interposed, a printing result 94b for the nozzle β is printed in timing of the print timing 76b after the encoder pulse 75 counts an elapse of the writing position 93 from when the printing sensor signal 73 sensed by the printing object sensor 12 is inputted. Here, since the print timing 61b is not thinned, printing is performed with a setting that a vertical dot line of a character to be printed by the nozzle β is printed one encoder pulse at a time.

With the above structure, it is possible to perform control in such a manner that a plurality of nozzles have different character widths even in a case where the writing position of the nozzle α and the writing position of the nozzle β are the same.

Although the above embodiments have especially described a twin nozzle machine, nozzles respectively perform printing independently even in a case of a multi nozzle machine having three or more nozzles, and it is possible to perform printing by separately controlling each nozzle of a printing pitch when an encoder is used.

Moreover, the present invention can be applied even when the nozzles are arranged in any of vertical, horizontal and diagonal directions.

REFERENCE SIGNS LIST

α Nozzle α
β Nozzle β
1 Ink jet recording apparatus body
2 Print head
3 Display panel
4 Conduit
5 Micro Processing Unit (MPU)
6 Random Access Memory (RAM)
7 Read Only Memory (ROM)
8 Display device
9 Panel IF (Interface)
10 Panel
11 Printing object sensing circuit
12 Printing object sensor
13 External signal sensing circuit
14, 14a, 14b Encoder
15 Electromagnetic valve
16 Feed pump
17a, 17b Recovery pump
18a, 18b Pressure sensor
19a, 19b Automatic phase (APH) detection circuit
20a, 20b Gutter
21a, 21b Exciting frequency generation circuit
22a, 22b Character signal generation circuit
23a, 23b Charging electrode
24a, 24b Deflecting voltage generation circuit
25a, 25b Deflecting electrode
26 Bus
27 Ink container
28 Conveying line
29 Printing object
30a, 30b Ink Particle
31 Printing result without encoder (one nozzle)
32 Printing sensor signal
33 Writing position
34 Printing result with encoder (one nozzle)
35 Printing sensor signal
36 Writing position
37 Encoder pulse
38 Print timing
39a, 39b Printing result without encoder (twin nozzles)
40 Printing sensor signal
41a, 41b Writing position
42a, 42b Printing result with encoder (twin nozzles: wide)
43 Printing sensor signal
44a, 44b Writing position 45 Encoder pulse
46 Print timing
47a, 47b Printing result with encoder (twin nozzles: narrow)
48 Printing sensor signal
49a, 49b Writing position
50 Encoder pulse
51 Print timing
52a, 52b Printing result (plural encoders)
53 Printing sensor signal
54a, 54b Writing position
55a, 55b Encoder pulse
56a, 56b Print timing
57a, 57b Printing result (pulse thinning)
58 Printing sensor signal
59a, 59b Writing position
60 Encoder pulse
61a, 61b Print timing
62 Pulse thinning interval
29A, 29B Printing object
63A, 63B Printing sensor signal
64A, 64B Sensor input
65A, 65B Writing position
66A, 66B Encoder pulse
67A, 67B Printing start position
68A, 68B Ink particle
69A, 69B Printing result
70 Dummy dot
71 Actual printing start position
72a, 72b Printing result (dummy dot)
73 Printing sensor signal
74a, 74b Writing position
75 Encoder pulse
76 Print timing
77 Printing elements
78 Character size
79 Vertical dot number
80 Character width
81 Particle usage rate
82 Writing position
83 Conveying line speed
84 Encoder pulse
85A, 85B, 85C Screen of present invention for selecting whether "Different Pitch Printing Control" is to be executed or not
86 Item "Different Pitch Control"
87 Item "Different Pitch Control System"
88 Item "Frequency Division Thinning Rate"
89 Item "Inserted Dot Number of First Line"
90 Item "Halfway-Inserted Dot Line"
91 Writing position
92a, 92b Printing result (pulse thinning (case where writing positions 91 are the same))
93 Writing position
94a, 94b Printing result (dummy dot (case where writing positions 93 are the same))

The invention claimed is:

1. An ink jet recording apparatus configured to perform printing control with a plurality of nozzles using an encoder pulse outputted from a common encoder configured to receive a speed of a conveying line, the ink jet recording apparatus comprising:
the plurality of nozzles;
the common encoder;
an input unit configured to separately set a printing character width for each of the plurality of nozzles; and
a control unit configured to control printing of a character width corresponding to input information from the input unit, wherein
the input unit is configured to set a printing interval between vertical dot lines of a printing character, which is composed of a plurality of vertical dot lines, for each of the plurality of nozzles using the number of pulses of an encoder pulse outputted from the common encoder, and
the control unit is configured to print by controlling a printing interval between vertical dot lines of a printing character for each nozzle based on the number of pulses set by the input unit.

2. An ink jet recording apparatus configured to perform printing control with a plurality of nozzles using an encoder pulse outputted from a common encoder configured to receive a speed of a conveying line, the ink jet recording apparatus comprising:
the plurality of nozzles;
the common encoder;
an input unit configured to separately set a printing character width for each of the plurality of nozzles; and
a control unit configured to control printing of a character width corresponding to input information from the input unit wherein
the input unit is configured to set the number of particles, which are inserted in front of and in back of a vertical dot line of a printing character composed of a plurality of vertical dot lines and are not used for printing, for each of the plurality of nozzles, and
the control unit is configured to print by controlling a printing character width for each nozzle based on the number of particles, which are set by the input unit and are not used for printing.

3. An ink jet recording apparatus configured to perform printing control with a plurality of nozzles using an encoder pulse outputted from a common encoder configured to receive a speed of a conveying line, the ink jet recording apparatus comprising:
the plurality of nozzles;
the common encoder;
an input unit configured to separately set a printing character width for each of the plurality of nozzles; and
a control unit configured to control printing of a character width corresponding to input information from the input unit, wherein
the input unit is configured to set a printing interval between vertical dot lines of a printing character, which is composed of a plurality of vertical dot lines, by selecting one from setting based on the number of pulses of an encoder pulse outputted from the common encoder for each of the plurality of nozzles and setting based on the number of particles, which are inserted in front of and in back of a vertical dot line of a printing character composed of a plurality of vertical dot lines and are not used for printing, for each of the plurality of nozzles, and
the control unit is configured to print by controlling a printing character width for each nozzle based on information set by the input unit.

* * * * *